May 1, 1962 W. H. ELLIOT 3,032,690
THERMALLY RESPONSIVE ELECTRICAL CONTROL SYSTEMS
Filed Feb. 20, 1959 2 Sheets-Sheet 1
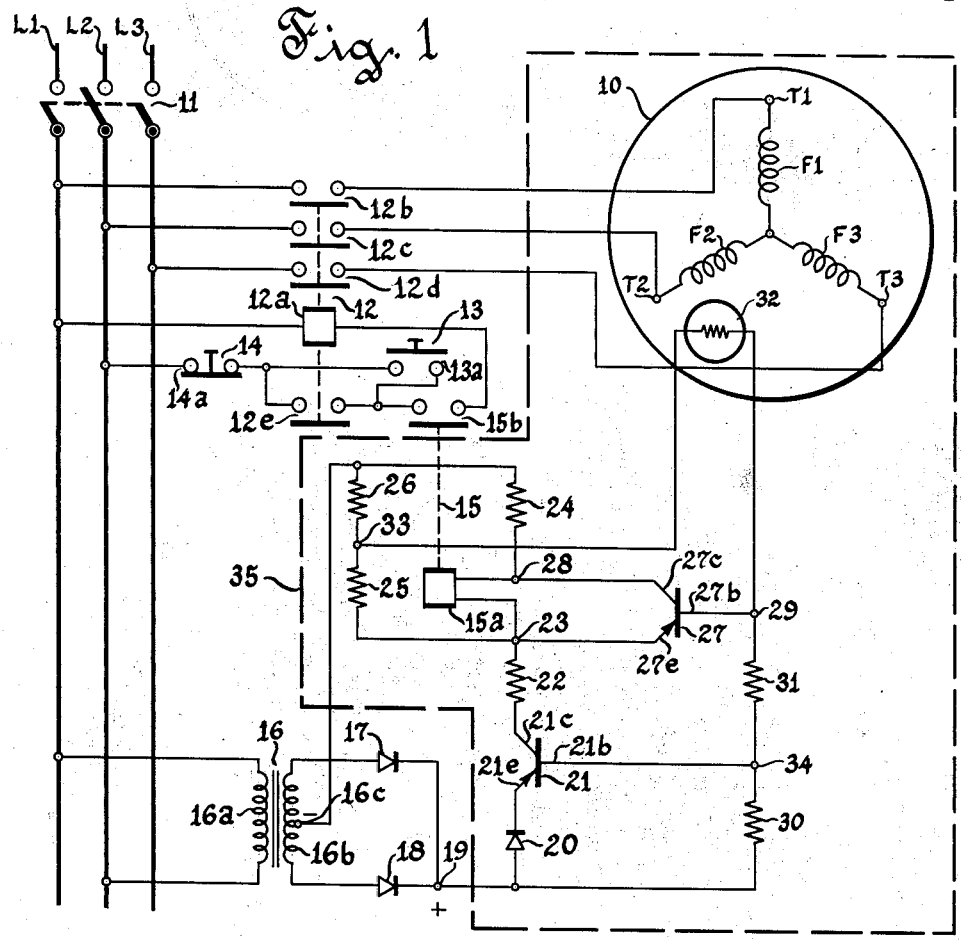
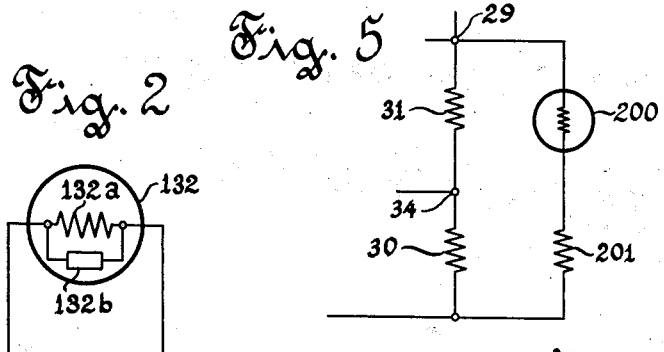
Inventor
William H. Elliot
By H R Rathew
Attorney May 1, 1962  W. H. ELLIOT  3,032,690
THERMALLY RESPONSIVE ELECTRICAL CONTROL SYSTEMS
Filed Feb. 20, 1959  2 Sheets-Sheet 2

United States Patent Office 3,032,690
Patented May 1, 1962

3,032,690
THERMALLY RESPONSIVE ELECTRICAL CONTROL SYSTEMS
William H. Elliot, Whitefish Bay, Wis., assignor to Cutler-Hammer, Inc., Milwaukee, Wis., a corporation of Delaware
Filed Feb. 20, 1959, Ser. No. 794,725
13 Claims. (Cl. 317—41)

This invention relates generally to thermally responsive electrical control systems. More particularly the invention relates to thermally responsive "fail safe" electrical control systems which employ thermistors.

In certain situations it is desirable to perform control functions in response to changes in temperature and to employ temperature responsive means which are not only extremely sensitive and fast-acting but which "fail safe" if certain defects occur. For example, some types of electric motors which are used to drive the compressors for refrigeration or air-conditioning equipment are hermetically sealed and depend upon circulation of a coolant to maintain proper operating temperatures therewithin. This method of cooling the motor permits the motor to operate on higher currents and thus carry greater loads than would ordinarily be the case if the same motor were not so cooled. However, if such a motor is subjected to stalled rotor conditions or to overload conditions and the normal circulation of coolant is impaired the temperature of the motor windings increases extremely rapidly to dangerous levels which may cause damage to the windings. It is necessary, therefore, to employ overload protective systems which, upon occurrence of such abnormal conditions, respond rapidly to actual temperatures within the motor rather than to current flow through the motor. Furthermore, it is desirable that such protective system be "fail safe" in certain respects, i.e., effect deenergization of the motor if certain defects occur in the protective system, in order that the motor is not permitted to operate without adequate protection against the abnormal conditions which may occur. Prior thermally responsive electrical control systems have been found wanting in several respects.

Accordingly, it is an object of this invention to provide improved temperature responsive electrical control systems which respond rapidly to temperature changes and, when in operation, are "fail safe" in certain respects.

Another object is to provide improved control systems of the aforesaid character which employ temperature responsive elements which are adapted to respond rapidly and with great sensitivity to temperature changes.

Still another object is to provide improved control systems of the aforesaid character which employ transistors to afford "fail safe" features.

A further object is to provide improved control systems of the aforesaid character wherein a multiplicity of temperature responsive elements, such as thermistors, may be employed in parallel arrangements.

A more specific object of the invention is to provide improved thermally responsive control systems of the aforesiad character which are particularly adapted to afford overload protection for electrical translating devices such as, for example, motors.

A still further object is to provide improved control systems of the aforesaid character which are relatively compact, reliable in use, have great sensitivity to thermal changes, respond rapidly to thermal changes, are adapted for a variety of uses, and are relatively economical to manufacture.

Other objects and advantages of the invention will hereinafter appear.

The accompanying drawings illustrate several preferred embodiments of the invention, it being understood that the embodiments shown are susceptible of various modifications with respect to details thereof without departing from the scope of the appended claims.

In the drawings:

FIGURE 1 is a schematic showing of an electric motor and a control system therefor, said control system including thermally responsive overload protective means employing a single thermistor sensing unit;

FIG. 2 is a schematic showing of an alternative form of thermistor sensing unit that may be employed with the control system shown in FIGS. 1, 3 and 4;

FIG. 5 is a detail view showing the addition of ambient temperature compensating means to the circuit of FIG. 1.

Figure 3:
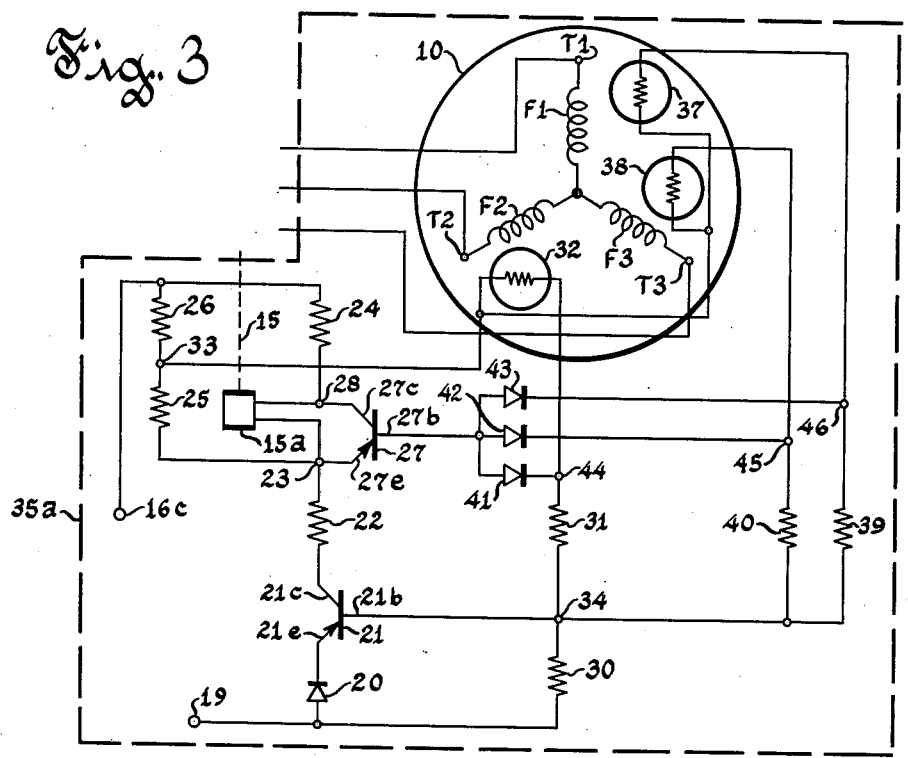
FIG. 3 is a schematic showing of an electric motor and a portion of the control system system therefor, said control system including thermally responsive overload protective means employing a multiplicity of thermistor sensing units in parallel arrangement.

FIG. 1 shows an A.C. motor 10 and a circuit for controlling its connection to and disconnection from the three phase A.C. supply lines L1, L2 and L3. For purposes of illustration, motor 10 is shown as having star-connected stator windings F1, F2 and F3. A manually operated circuit breaker 11, shown in open condition, is provided to connect lines L1, L2 and L3 to the control circuit.

An electroresponsive contactor 12 having normally open contacts 12b, 12c and 12d in the circuit connections between lines L1, L2 and L3, respectively, and the primary terminals T1, T2 and T3, respectively, of motor 10 is adapted to effect energization of motor 10 whenever its operating coil 12a is energized.

Operating coil 12a of contactor 12 has one side connected to line L1 and its other side is adapted to be connected to line L2 through the normally open contact 15b of an electro-responsive relay 15, through the normally open contact 13a of a Start pushbutton switch 13, and through the normally closed contact 14a of a Stop pushbutton switch 14. A normally open maintaining contact 12e of contactor 12 is connected across contact 13a of Start pushbutton switch 13.

A step-down transformer 16 is provided to afford a relatively low voltage source of power supply for electro-responsive relay 15 and for semiconductor and transistor elements hereinafter described. The primary winding 16a of transformer 16 is connected across lines L1 and L2 and the upper and lower end terminals of the secondary winding 16b of transformer 16 are connected to the input sides of the half-wave rectifiers 17 and 18, respectively. The output sides of rectifiers 17 and 18 are connected to a common point hereinafter referred to as output terminal 19. Rectifiers 17 and 18 are poled so that output terminal 19 is electrically positive and the center tap of secondary winding 16b of transformer 16, hereinafter referred to as output terminal 16c, is electrically negative when energized.

Output terminal 19 is connected to the input side of a half-wave rectifier 20, preferably a germanium diode known as a "stabistor," which is adapted to exhibit a predetermined voltage drop thereacross relatively independent of the flow of current and to thus afford a bias voltage for fail-safe operation of the circuit, as will be described later in more detail. The output side of rectifier 20 is connected to the emitter terminal 21e of a transistor 21 which may be assumed to be of the P-N-P type. The collector terminal 21c of transistor 21 is connected to one side of a resistor 22 whose other side is connected to one side of the operating coil 15a of relay 15. The other side of operating coil 15a of relay 15 is connected in series with resistor 24 to output terminal 16c. As will hereinafter be explained, transistor 21 is adapted to be biased to full conduction to maintain operating coil 15a of relay 15 energized and is further adapted under certain conditions to effect deenergization of operating coil 15a.

The emitter terminal 27e of another P-N-P type transistor 27 is connected to a point common 23 between resistor 22 and operating coil 15a of relay 15. The collector terminal 27c of transistor 27 is connected to a common point 28 between operating coil 15a of relay 15 and resistor 24. As will hereinafter be explained, transistor 27 is adapted to be biased to non-conduction to maintain operating coil 15a of relay 15 energized and is further adapted under certain conditions to effect substantial deenergization of operating coil 15a.

Two voltage dividing resistors 25 and 26 are connected in series with each other between common point 23 between resistor 22 and operating coil 15a of relay 15 and output terminal 16c. By substituting a resistor of lower value for resistor 25, or by substituting a resistor of higher value for resistor 26, the controller can be adjusted to cause relay 15 to drop out at higher motor temperatures i.e., the temperature affecting thermistor unit 32, hereinafter described, would have to be higher before the operating coil 15a of relay 15 was deenergized, as will hereinafter be explained. Similarly, by substituting a resistor of higher value for resistor 25, or a resistor of lower value for resistor 26, the reverse result would be obtained. Two voltage dividing resistors 30 and 31 and a thermistor unit 32, hereinafter described, are connected in series with each other between output terminal 19 and a common point 33 between resistors 25 and 26.

Base terminal 21b of transistor 21 is connected to a common point 34 between resistors 30 and 31 and base terminal 27b of transistor 27 is connected to a common point 29 between resistor 31 and thermistor unit 32.

Thermistor unit 32 is formed of resistance material which has a negative temperature coefficient of resistance and has a configuration and physical size which adapts it for mounting within motor 10 in close thermal relationship with the stator windings and is responsive to the temperature thereof. Preferably, the thermistor unit 32 is embedded in a stator winding, such as F2, but is electrically insulated therefrom. For purposes of illustration, it may be assumed that motor 10 is to be deenergized when the temperature of its stator windings reaches approximately 100 degrees centigrade. It may be further assumed that thermistor unit 32 has a value of approximately 680 ohms at a temperature of 100 degrees centigrade and a value of approximately 10,000 ohms at 25 degrees centigrade.

In the circuit thus far described it is to be understood that normally the resistance of thermistor unit 32 is relatively high and that transistor 27 is biased to non-conduction because its base terminal 27b is positive with respect to its emitter terminal 27e. However, when the resistance of thermistor unit 32 decreases in response to heating thereof when motor 10 is overloaded, transistor 27 is biased to full conduction because its base terminal 27b becomes sufficiently negative with respect to its emitter terminal 27e.

FIG. 2 shows a thermistor unit 132 which can be employed in place of thermistor unit 32. Thermistor unit 132 comprises a portion 132a formed of material having a negative temperature coefficient of resistance and a portion 132b formed of resistance material having no appreciable temperature coefficient of resistance. Portion 132b forms a shunt across portion 132a and preferably should be physically integral with portion 132a so that detachment of a lead will open the circuit through both portion 132a and portion 132b. For example, portion 132b could be a coating of electrically conductive resistance material adhering to portion 132a. The advantage in using a thermistor unit such as 132 is that the unit remains conductive at extremely low ambient temperatures which could conceivably render a thermistor unit such as 32 sufficiently non-conductive to cause transistor 21 to be biased to non-conduction thereby preventing operating coil 15a of relay 15 from being energized.

Whereas FIG. 1 shows a single thermistor unit 32 associated with a single stator winding F2 of motor 10, it is apparent that it may be desirable to associate additional thermistor units with the other stator windings F1 and F3 to sense the temperatures therewithin. It has been found that the mere connection of such additional thermistor units in parallel circuit with thermistor 32 is undesirable for the reason that the system is then responsive to the average resistance of the paralleled thermistors. Thus, for example, if unequal heating of the several parallel thermistors occurred due to a defect in one or two of the stator windings or due to single phase operation of motor 10 the total resistance of all the thermistors in parallel might still be sufficiently high to maintain transistor 27 biased to non-conduction. A further drawback of such parallel connection is that if one of the circuits containing a thermistor unit were to open, it would be necessary to raise the temperature of the remaining thermistors beyond the temperature at which they would normally respond before transistor 27 became biased to non-conduction and such a temperature could conceivably damage motor 10.

Figure 4:
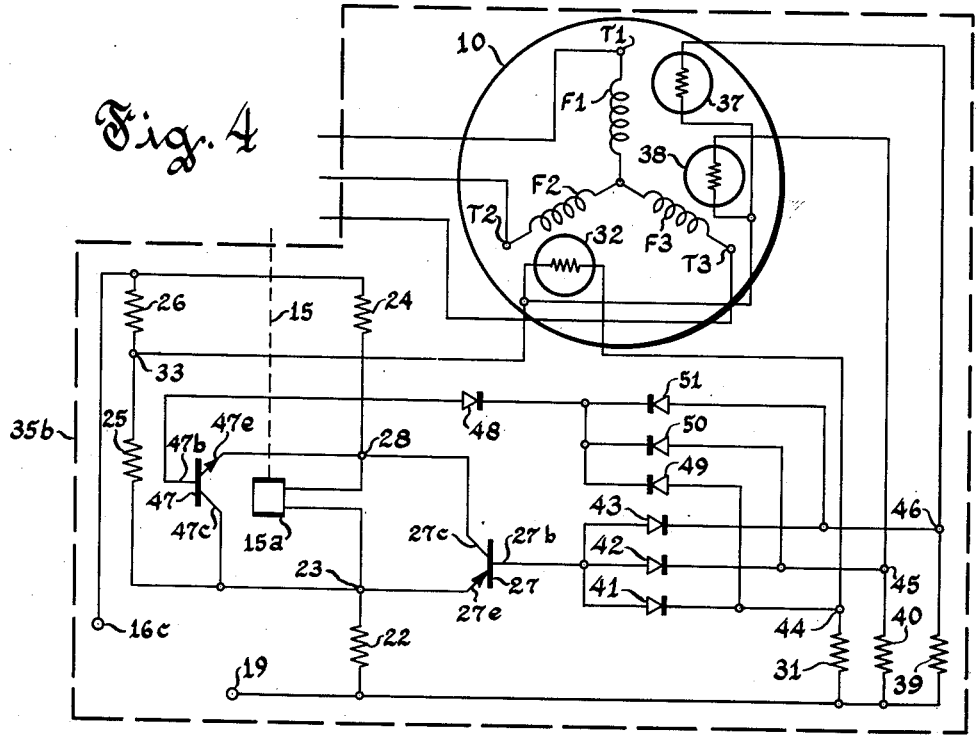
FIG. 4 is a schematic showing of an alternative circuit that can be substituted for a portion of the control system of FIG. 1.

FIGS. 3 and 4 disclose alternative improved circuits wherein additional thermistor units are employed with motor 10 which overcome the aforementioned difficulties and have other advantages. Although FIGS. 3 and 4 show a type of thermistor unit similar to that shown in FIG. 1 it is to be understood that the type of thermistor unit shown in FIG. 2 can be employed to advantage therein.

Referring now to FIG. 3, the broken line indicated by the numeral 35a encloses an alternative circuit arrangement that will be understood to be substituted for that portion of the circuit shown in FIG. 1 and enclosed by the broken line 35. In FIGS. 1 and 3 similar elements have been indicated by the same reference numerals. FIG. 3 shows additional thermistor units 37 and 38 which are physically associated with the stator winding F1 and F3, respectively, of motor 10 in the same manner in which thermistor unit 32 is physically associated with stator winding F2, as was hereinbefore explained. In FIG. 3 one side of each of the thermistor units 32, 37 and 38 is connected to common point 33 between voltage dividing resistors 25 and 26. The other side of each of the thermistor units 32, 37 and 38 is connected in series with the resistors 31, 39 and 40, respectively, to common point 34. The base terminal 27b of transistor 27 is connected to the input side of each of three rectifiers 41, 42 and 43 and the output side of each of the latter rectifiers is connected, respectively, to a point 44 between thermistor unit 32 and resistor 31, to a point 45 between thermistor unit 38 and resistor 40, and to a point 46 between thermistor unit 37 and resistor 39. As will hereinafter be explained, in the circuit shown in FIG. 3 the thermistor unit having the highest temperature is adapted to dominate in effecting biasing of transistor 27 to full conduction to the practical exclusion of the other thermistors.

In FIG. 3 operating coil 15a of the relay will not deenergize until all thermistor circuits are open, therefore, if one or two open, motor 10 runs without full protection if a single phase condition should occur.

Referring now to FIG. 4, the broken line indicated by the numeral 35b encloses an alternative circuit arrangement that will be understood to be substituted for that portion of the circuit shown in FIGS. 1 and 3 and indicated by the broken line 35 and 35a, respectively. In FIGS. 1, 3 and 4 similar elements have been indicated by the same reference numeral. The circuit shown in FIG. 4 is an improvement over that shown in FIG. 3 in that it is adapted to effect deenergization of relay 15 in the event that one thermistor in the group 32, 37 and 38 open circuits.

FIG. 4 differs from FIG. 3 in that rectifier 20, transistor 21 and resistor 30 have been deleted from the circuit and a transistor 47, a so called "Zener" diode or voltage regulating diode 48 and three half-wave rectifiers 49, 50 and 51 have been added, as will hereinafter be explained.

In FIG. 4 the output terminal 19 is connected directly to the aforementioned one end of resistor 22 and to one end of the resistors 31, 40 and 39, respectively. Furthermore, the emitter terminal 47e of transistor 47, which may be assumed to be of the N-P-N type, is connected to common point 28 and the collector terminal 47c thereof is connected to common point 23. The base terminal 47b of transistor 47 is connected to the output side (i.e., arrow side) of voltage regulating diode 48, which it is to be understood is non-conductive in the direction opposite to the arrow unless subjected to a voltage of predetermined value. The input side of diode 48 is connected to the output side of each of three rectifiers 49, 50 and 51 and the output side of each of the latter rectifiers is connected, respectively, to the points 44, 45 and 46. As will hereinafter be more fully explained, diode 48 is normally non-conductive and therefore biases transistor 47 to non-conduction. In the circuit shown in FIG. 4, an opening in any branch of the circuit containing a thermistor unit will render transistor 47 conductive to effect deenergization of operating coil 15a of relay 15.

Preferably, the systems shown in FIGS. 1, 3 and 4 should be provided with some means affording ambient temperature compensation. Without such compensation, as the temperature of the controllers rise due to increases in ambient temperature the sensing thermistor units located within motor 10 would tend to respond to effect deenergization of motor 10 (i.e., effect deenergization of operating coil 15a of relay 15) at lower temperatures of the motor than is normally desired. As FIG. 5 shows, ambient temperature compensation can be provided for in the circuit shown in FIG. 1 by the addition of a compensating circuit comprising a thermistor 200 connected in series with a resistor 201 which circuit is connected across resistors 30 and 31, or if preferred by connecting the compensating circuit in parallel with resistor 24. If such ambient temperature compensation means are provided in FIG. 1, then increases in the ambient temperature which effect increases in the temperature of the controller cause point 29 to become more positive when the controller is in operation. By this means, motor 10 will be deenergized at a predetermined temperature regardless of changes in ambient temperature to which the controller is subjected.

Ambient temperature compensation is provided for the circuit shown in FIG. 3 by the addition of three separate compensating circuits such as hereinbefore described, across resistors 30 and 31, resistors 30 and 40, and 30 and 39, respectively, or, if preferred, by placing a single compensating circuit in parallel with resistor 24.

Ambient temperature compensation is provided for the circuit shown in FIG. 4 by the addition of three separate compensating circuits, such as hereinbefore described, across resistors 31, 40 and 39, respectively, or, if preferred, by placing a single compensating circuit in parallel with resistor 24.

The control system shown in FIG. 1 operates as follows:

Assume that supply lines L1, L2 and L3 are energized. Closure of circuit breaker 11 effects energization of transformer 16 and rectified current flows from output terminal 19 through rectifier 20, through transistor 21 from emitter terminal 21e to collector terminal 21c, through resistor 22, through operating coil 15a of relay 15 and through resistor 24 to output terminal 16c. Operating coil 15a of relay 15 is then energized and contact 15b closes.

It will be understood that some current flows from common point 23 through the voltage dividing resistors 25 and 26 to output terminal 16c and that some current also flows from output terminal 19, through resistors 30 and 31 and through thermistor unit 32 to common point 33. Thermistor unit 32 is not yet heated by the stator winding of motor 10 and its electrical resistance is, therefore, relatively high. While this condition prevails transistor 21 is biased to full conduction because its base terminal 21b is more negative than its emitter terminal 21e and transistor 27 is biased to non-conduction because its base terminal 27b is more positive than its emitter terminal 27e.

With relay 15 energized and contact 15b closed, as hereinbefore described, motor 10 is ready for operation. Momentary depression of Start pushbutton switch 13 effects momentary closure of contact 13a thereof and an energizing circuit for operating coil 12a of contactor 12 is established from supply line L1 through operating coil 12a, contact 15b, contact 13a and contact 14a of Stop pushbutton switch 14 to supply line L2. Energization of operating coil 12a of contactor 12 effects closure of contacts 12b, 12c and 12d which connect the terminals T1, T2 and T3, respectively, of motor 10 to the supply lines L1, L2 and L3, respectively, thereby energizing motor 10 for operation. Energization of operating coil 12a of contactor 12 also effects closure of contact 12e which maintains operating coil 12a energized after contact 13a of Start pushbutton switch 13 opens.

Motor 10 may be deenergized by momentary depression of Stop pushbutton switch 14 to effect momentary opening of the contact 14a thereof thereby interrupting the energizing circuit for operating coil 12a of contactor 12. Deenergization of operating coil 12a of contactor 12 effects opening of contacts 12b, 12c and 12d thereby disconnecting the terminals T1, T2 and T3, respectively, of motor 10 from line L1, L2 and L3, respectively, and effects opening of maintaining contact 12e.

Assume, however, that motor 10 is permitted to operate. It will be understood that the temperature of the stator windings F1, F2 and F3 of motor 10 will increase to the normal operating temperature of the motor and that the temperature of thermistor unit 32 is such that the decrease in its resistance attending this normal temperature increase in motor 10 is insufficient to render transistor 27 conductive and operating coil 15a of relay 15 remains energized.

Now assume that motor 10 is subjected to an overload or stalled rotor condition which causes the temperature of stator windings F1, F2 and F3 to rise abnormally, for example, to 100 degrees centigrade. As hereinbefore explained, if motor 10 were hermetically sealed such an increase in temperature could occur rapidly and it would be desirable to deenergize the motor quickly before damage thereto resulted. As the temperature of stator winding F2 increases abnormally, the temperature of thermistor unit 32 which is closely associated therewith increases accordingly and its resistance decreases, for example, to about 680 ohms at 100 degrees centigrade. As thermistor unit 32 approaches its low value the base terminal 27b of transistor 27 is rendered sufficiently more negative with respect to emitter terminal 27e thereof to render transistor 27 conductive. Current begins to flow from a common point 23, through transistor 27 from emitter terminal 27e to collector terminal 27c, to common point 28 and operating coil 15a of relay 15 is shunted. Contact 15b of relay 15 opens to interrupt the energizing circuit for operating coil 12a of contactor 12 and contacts 12b, 12c and 12d open to disconnect motor 10 from the supply lines L1, L2 and L3 and maintaining contact 12e opens.

After motor 10 is deenergized and its stator windings have cooled sufficiently to permit safe operation, the temperature of thermistor unit 32 decreases and its resistance increases sufficiently to again render base terminal 27b of transistor 27 more positive with respect to emitter terminal 27e thereof and transistor 27 again becomes non-conductive between emitter terminal 27e and collector terminal 27c. Operating coil 15a of relay 15 again becomes fully energized and contact 15b recloses. Motor 10 is again ready to be operated in response to momentary depression of Start pushbutton switch 13, as hereinbefore described.

The control system shown in FIG. 1 is adapted so that if the branch of the circuit between common points 29 and 33 which contain thermistor unit 32 were to open for any reason while the controller is energized, then the potential of base terminal 21b of transistor 21 will tend to become more positive than that of emitter terminal 21e thereof and transistor 21 will bias to non-conduction thereby effecting deenergization of operating coil 15a of relay 15. As hereinbefore explained, deenergization of relay 15 effects deenergization of contactor 12 and deenergization of motor 10 if the latter is in operation. Furthermore, if transistor 27 were to fail due to excessive ambient or internal temperatures and were thus rendered continuously conducting between emitter terminal 27e and collector terminal 27c, relay 15 would be deenergized. It is, of course, apparent that an opening in any branch of the circuit supplying power to operating coil 15a of relay 15 will effect deenergization of motor 10 since relay 15 is adapted to be energized, normally.

The control system shown in FIG. 3 operates as follows:

Assume that operating coil 15a of relay 15 is energized and contact 15b is closed, that contactor 12 is energized and that motor 10 is energized and is in normal operation, as was hereinbefore explained in connection with FIG. 1. It is to be understood that transistor 21 is biased to full conduction and that transistor 27 is biased to non-conduction.

Now assume that motor 10 is subjected to an overload or stalled rotor condition which causes the temperatures of the stator windings F1, F2 and F3 to rise abnormally, for example, to 100 degrees centigrade or higher. If the temperature rise in windings F1, F2 and F3 is substantially equal, the decrease in resistance in thermistor units 32, 37 and 38 will be substantially equal and the average resistance will cause base terminal 27b to become sufficiently more negative with respect to emitter terminal 27e thereof to render transistor 27 conductive between its emitter terminal 27e and its collector terminal 27c thereby shunting operating coil 15a of relay 15. Contact 15b of relay 15 opens to interrupt the energizing circuit for operating coil 12a of contactor 12 and contacts 12b, 12c and 12d open to disconnect motor 10 from supply lines L1, L2 and L3 and maintaining contact 12e opens.

The circuit of FIG. 3 is superior to that of FIG. 1, however, in the following respects. If one of the windings F1, F2, or F3 should be subjected to a substantially higher temperature than the others as a result of single phase operation of the motor, poor thermal contact between one or more of the thermistors and its winding, or defects in a thermistor, sufficient current will flow through the transistor 27 from emitter terminal 27e to base terminal 27b to effect conduction of transistor 27 and deenergization of operating coil 15a to the drop-out point of relay 15. This is due to the fact that the thermistor which exhibits the lowest resistance (highest temperature) will dominate to the practical exclusion of the remaining thermistors by virtue of the circuit isolating action of rectifiers 41, 42, and 43. This feature, therefore, affords single-phase protection of the motor. Additionally, it permits continued operation of the system in the event of a defect in an individual thermistor circuit through the expedient of by-passing the defective circuit through addition to the system of a resistor (not shown) of several thousand ohms resistance. The difference in tripping temperature due to individual thermistor operation as against all thermistors exhibiting practically identical temperature-resistance characteristics is on the order of 5%. Such a difference is ordinarily insignificant, especially in view of the improbability of identical thermal performance of the several thermistors.

The control system shown in FIG. 4 operates as follows:

Assuming that transformer 16, shown in FIG. 1, is energized, current flows from output terminal 19, through resistor 22, through operating coil 15a of relay 15 and through resistor 24 to output terminal 16c. Operating coil 15a of relay 15 is thus energized and contact 15b closes.

It will be understood that some current flows from common point 23 through the voltage dividing resistors 25 and 26 to output terminal 16c. Current also flows in parallel paths from output terminal 19 through resistor 31 and thermistor unit 32 to common point 33, from output terminal 19 through resistor 39 and thermistor unit 37 to common point 33, and from output terminal 19 through resistor 40 and thermistor unit 38 to common point 33. As will be understood, transistor 27 is normally biased to non-conduction because its base terminal 17b is more positive than its emitter terminal 27e. Transistor 47 is also normally biased to non-conduction between its emitter terminal 47e and its collector terminal 47c because its base terminal 47b is more negative than its emitter terminal 47e.

Base terminal 47b is more negative than emitter terminal 47e by virtue of the fact that voltage regulating diode 48 remains substantially non-conducting in the conventional current flow direction (i.e., opposite to the direction of the arrow) until the potential drop exceeds a characteristic value, such as, for example, 12 volts. Under normal controller operation this value is not exceeded.

Upon occurrence of an overload or stalled rotor condition, thermistor units 32, 37 and 38 respond to effect deenergization of operating coil 15a of relay 15 as was hereinbefore explained in connection with FIG. 3.

Should the resistance between any one of the junctions 44, 45 or 46 and the common junction 33 become abnormally high, however, as would be the case if any one or more of the thermistor circuits opened, the characteristic voltage of voltage regulating diode 48 would be exceeded, current would flow from output terminal 19 through the resistor 31, 39 or 40 and the rectifiers 49, 51 or 50 associated with the defective thermistor circuit, through voltage regulating diode 48, through transistor 47 from the base terminal 47b to emitter terminal 47e, and through resistor 24 to the output terminal 16c. This base-emitter current flow in transistor 47 would cause current to flow from collector terminal 47c to emitter terminal 47e to effect deenergization of operating coil 15a and drop-out of relay 15. Deenergization of the motor 10 would be thereby effected upon a break or opening of a sensing thermistor circuit. Operation may be resumed, if desired, by by-passing the defective thermistor with a resistor of several thousand ohms, as hereinbefore described in connection with FIG. 3. The protection normally afforded by the thermistor in the defective branch circuit is, of course, lost.

Although the system shown in FIGS. 1, 3 and 4 utilize thermistor units having negative temperature coefficients of resistance, it is apparent that thermistors having positive temperature coefficients of resistance could be employed as temperature sensing elements, provided, of course, that suitable modifications were made in the circuit. In FIG. 1 for example, interchanging the relative positions of thermistor unit 32 and resistor 31 would be required. Similar changes could be carried out in FIGS. 3 and 4.

I claim:

1. In a "fail safe" thermally responsive electrical control system, in combination, a source of power supply, a translating device energizable from said source, a first resistor in series with said translating device, first and second transistors each having emitter, collector and base terminals, said first transistor having its emitter-collector circuit connected in parallel with said translating device, said second transistor having its emitter-collector circuit connected in circuit with said translating device to control its energization, and at least one branch circuit connected across said source, said branch circuit comprising a thermally responsive resistance element and a second resistor, said base terminal of said first transistor connected to a point between said resistance element and said second resistor, said base terminal of said second transistor connected to one side of said second resistor in said branch circuit.

2. The combination according to claim 1 wherein said first transistor is of the P-N-P type, and wherein said second transistor is of the P-N-P type and has its emitter-collector circuit connected in series with said translating device and across said source.

3. The combination according to claim 2 wherein said first transistor has a rectifier connected in the circuit connection between its base terminal and the said point between said resistance element and said second resistor.

4. The combination according to claim 1 wherein said first transistor is of the P-N-P type, and has a rectifier connected in the circuit connection between its base terminal and the said point between said resistance element and said resistor, wherein said second transistor is of the N-P-N type and has its emitter-collector circuit connected in parallel with said translating device, and wherein a Zener diode and another rectifier is connected in circuit between the base terminal of said second transistor and the aforesaid point.

5. In a "fail safe" thermally responsive electrical control system, in combination, a source of power supply, a translating device, a first resistor in series with said translating device, first and second transistors each having emitter, collector and base terminals, said second transistor having its emitter-collector circuit connected in series with said translating device and said first resistor across said source, said first transistor having its emitter-collector circuit connected in parallel with said translating device, and a branch circuit connected across said source, said branch circuit comprising a thermally responsive resistance element and a second resistor, said base terminal of said second transistor connected to a point between said second resistor in said branch circuit and said source, and said base terminal of said first transistor connected to another point between said resistance element and said second resistor.

6. The combination according to claim 5 wherein said first and second transistors are of the P-N-P type.

7. In a "fail safe" thermally responsive electrical control system, in combination, a source of power supply, a translating device, a first resistor connected in series with said translating device, first and second transistors each having emitter, collector and base terminals, said second transistor having its emitter-collector circuit connected in series with said translating device across said source, said first transistor having its emitter-collector circuit connected in parallel with said translating device, a plurality of branch circuits connected in parallel with each other across said source, each of said branch circuits comprising a thermally responsive resistance element and a second resistor, said base terminal of said second transistor connected to a point between said second resistor in each of said branch circuits and said source, and rectifiers connected between said base terminal of said first transistor and another point in each branch circuit between said resistance element and said second resistor.

8. The combination according to claim 7 wherein said first and second transistors are of the P-N-P type, and said rectifiers are poled to prevent current flow toward said base terminal of said first transistor.

9. In a "fail safe" thermally responsive electrical control system, in combination, a source of power supply, a translating device, a first resistor connected in series with said translating device across said source, first and second transistors each having emitter, collector and base terminals, said first and second transistors having their emitter-collector circuits connected in parallel with said translating device, a plurality of branch circuits connected in parallel with each other across said source, each of said branch circuits comprising a thermally responsive resistance element and a second resistor, first rectifiers connected between said base terminal of said first transistor and a point in each branch circuit between said resistance element and said second resistor, a voltage regulating diode having one side connected to the said base terminal of said second transistor, and second rectifiers connected between the other side of said voltage regulating diode and the aforesaid point in each branch circuit.

10. The combination according to claim 9 wherein said first transistor is of the P-N-P type, said second transistor is of the N-P-N type, said first rectifiers are poled to prevent current flow toward said base terminal of said first transistor, and said second rectifiers are poled to permit current flow toward said voltage regulating diode.

11. In a "fail safe" thermally responsive electrical control system, in combination, a source of electrical power supply, electrical translating means, and control means for controlling the energization and deenergization of said translating means and including first transistor means connected in circuit with said source and said translating means and when conductive acting to shunt current from the latter to effectively deenergize the same, thermally responsive electrical resistance means in circuit with said source and said transistor means which normally acts to maintain said transistor means non-conductive but when subjected to a given temperature change causes conduction of said transistor means, and second transistor means in circuit with said source, said translating means and said electrical resistance element, said second transistor means upon opening of a circuit branch which includes said electrical resistance means acting to effectively deenergize said translating means.

12. The combination according to claim 11, wherein said second transistor means is connected in series with said translating means, is normally conductive and made non-conductive by said opening of said circuit branch including said electrical resistance means.

13. The combination according to claim 11, wherein said second transistor means is connected in parallel with said translating means, is normally non-conductive, and is made conductive to shunt current from said translating means and effectively deenergize the latter whenever said branch circuit including said electrical resistance means is opened.

References Cited in the file of this patent

UNITED STATES PATENTS

| | | |
|---|---|---|
| 2,428,568 | Hill | Oct. 7, 1947 |
| 2,828,450 | Pinckaers | Mar. 25, 1958 |
| 2,859,402 | Schaeve | Nov. 4, 1958 |
| 2,866,147 | Bishsel | Dec. 23, 1958 |
| 2,885,570 | Bright | May 5, 1959 |
| 2,955,237 | Wyndham | Oct. 4, 1960 |

FOREIGN PATENTS

| | | |
|---|---|---|
| 735,755 | Great Britain | Aug. 31, 1955 |